(12) United States Patent
Hasty et al.

(10) Patent No.: US 10,866,688 B2
(45) Date of Patent: Dec. 15, 2020

(54) AUGMENTED REALITY TOUR GUIDE

(71) Applicant: Royal Caribbean Cruises Ltd., Miami, FL (US)

(72) Inventors: Joey Hasty, Miami, FL (US); David Smith, Orlando, FL (US); Josh Nakaya, Glendale, CA (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 0 days.

(21) Appl. No.: 16/268,476

(22) Filed: Feb. 5, 2019

(65) Prior Publication Data

US 2020/0249817 A1    Aug. 6, 2020

(51) Int. Cl.
| | |
|---|---|
| *G06T 15/00* | (2011.01) |
| *G06F 3/0481* | (2013.01) |
| *G06T 13/40* | (2011.01) |
| *G06T 19/00* | (2011.01) |
| *G06F 3/0482* | (2013.01) |

(52) U.S. Cl.
CPC ........ *G06F 3/04815* (2013.01); *G06F 3/0482* (2013.01); *G06T 13/40* (2013.01); *G06T 19/006* (2013.01)

(58) Field of Classification Search
CPC .... G06T 19/006; G03H 1/2202; G11B 7/0065
USPC ........................................................ 345/418
See application file for complete search history.

(56) References Cited

U.S. PATENT DOCUMENTS

| | | | | |
|---|---|---|---|---|
| 9,105,210 | B2* | 8/2015 | Lamb | G06F 3/1431 |
| 9,524,081 | B2* | 12/2016 | Keane | G10L 21/10 |
| 9,959,658 | B2* | 5/2018 | Conness | G06F 16/54 |
| 10,134,174 | B2* | 11/2018 | Ambrus | G06T 15/04 |
| 10,503,120 | B2* | 12/2019 | Smithwick | G03H 1/22 |
| 2018/0043259 | A1* | 2/2018 | Wong | A63F 13/5255 |
| 2019/0073831 | A1* | 3/2019 | Kim | G03H 1/0005 |
| 2019/0073832 | A1* | 3/2019 | Kim | G06T 19/003 |
| 2020/0026257 | A1* | 1/2020 | Dalal | G06N 5/02 |

OTHER PUBLICATIONS

Li Y, Zhou P, Su Y. Holographic Displays for AR Applications. In2019 IEEE International Conference on Consumer Electronics (ICCE) Jan. 11, 2019 (pp. 1-2). IEEE.*

(Continued)

*Primary Examiner* — Phu K Nguyen

(74) *Attorney, Agent, or Firm* — Steven M. Greenberg, Esq.; Shutts & Bowen LLP

(57) ABSTRACT

In augmented reality self-guided tour, different augmented reality views are received in a mobile computing device. One of the views presents a holographic animation of a tourable three-dimensional structure with multiple activatable points of interest disposed thereon. A geographic location of the device relative to the structure is determined and a camera of the device retrieves an image of a surrounding portion of the environment so as to compute a position in the image at which to render the animation. The animation is then projected in the display at the computed position. Upon selecting an activatable point of interest, it is determined if the geographic location matches that of the selected point of interest. If so, a different animation associated with the selected point of interest is projected in the display at the computed position.

18 Claims, 2 Drawing Sheets

(56) References Cited

OTHER PUBLICATIONS

Hartl AD, Arth C, Grubert J, Schmalstieg D. Efficient verification of holograms using mobile augmented reality. IEEE transactions on visualization and computer graphics. Nov. 6, 2015;22(7):1843-51.*

* cited by examiner

AUGMENTED REALITY TOUR GUIDE

BACKGROUND OF THE INVENTION

Field of the Invention

The present invention relates to augmented reality and more particularly to the use of augmented reality in conducting a self-guided tour.

Description of the Related Art

Virtual reality refers to the computerized display of a computer-generated environment imitating a corresponding real-world physical environment. In virtual reality, the computer-generated environment often provides a first-person viewpoint and is responsive to computer directed movements so that the first-person viewpoint presented in the computerized display changes according to the computer directed movements. Early forms of virtual reality required the end user to input the computer directed movements through a conventional computing system. But, more recent virtual reality systems incorporate human wearable or holdable sensors so that the movements are translated directly from the sensed movements of the human wearable or holdable sensors. Indeed, the most recent renditions of virtual reality rigs include a wearable headset such that the end user only perceives the imagery on a display of the headset without seeing any of the real, physical world. In this way, virtual reality has become an immersive experience.

Augmented reality is a close cousin of virtual reality in that augmented reality more closely bridges actual reality with a fabricated digital reality. In this regard, augmented reality refers to an interactive experience compositing a real-world environment with real-world objects augmented through the use of computer-generated perceptual information. In many instances, this object augmentation traverses multiple sensory modalities, including visual, auditory, haptic, somatosensory, and olfactory. The overlaid sensory information can be constructive meaning that the information adds to a real-world, natural environment, or destructive in so far as the information masks the real world, natural environment. In either circumstance, the augmented real-world objects are seamlessly interwoven with the physical world such that the totality may be perceived as an immersive aspect of the real environment. Consequently, augmented reality alters ongoing perception of a real world environment, whereas virtual reality completely replaces the real world environment with a simulated environment.

Both virtual reality and augmented reality have found their way into the domain of manually assisted guided touring. In particular, virtual reality and augmented reality, in simulating a known environment, permits an individual to explore that environment without actually being present in that same environment. Classic examples include flight simulation tools and law enforcement situation tools. Both instances of augmented reality, each requires substantial involvement of a third party in real time managing the scenarios experienced by the individual during the augmented reality experience. Indeed, absent the assistance of an environment controller, the vast selection of prospective integrations mixing computer generated animations with actual reality would be overwhelming for the end user.

BRIEF SUMMARY OF THE INVENTION

Embodiments of the present invention address deficiencies of the art in respect to integrating augmented reality into self-guided touring and provide a novel and non-obvious method, system and computer program product for an augmented reality self-guided tour. In an embodiment of the invention, an augmented reality self-guided touring method includes receiving from over a computer communications network into memory of a mobile computing device, a set of different holographic animations, each having an association with a different physical location of a three-dimensional structure. Thereafter, a first one of the different holographic animations in the set may be selected through a display of the mobile computing device. Once the first holographic animation has been selected, a physical location in the three-dimensional structure assigned to the first holographic animation is determined and the mobile computing device, geo-located within an area of the three-dimensional structure.

Then, on condition that the mobile computing device is geo-located at the physical location assigned to the first one of the different holographic animations, the camera activates, acquires and presents in the display of the mobile computing device, imagery of a proximate portion of the area of the three-dimensional structure. Further, the processor of the mobile computing device computes an image boundary within the acquired imagery and overlays in the image boundary in the display of the mobile computing device, the first one of the different holographic animations while continuing to present in the display of the mobile computing device newly acquired imagery of the proximate portion of the area of the three-dimensional structure. In this way, the scenarios experienced by the individual during the augmented reality experience is managed in a sensible way in accordance with a geographic relationship between the selected scenario and the mobile computing device without requiring intervention by a third party.

In one aspect of the embodiment, the holographic image is a three-dimensional animated model of the three-dimensional structure, such as a ship, and optionally includes an individual speaking behind the ship. As such, the three-dimensional animated model when overlain in the image boundary, presents a multiplicity of different activatable points at a virtual location in the model, each corresponding to an actual geographic position in the three-dimensional structure, and each having a hyperlink to a different one of the different holographic animations in the set. Consequently, an activation of any one of the points causes a processor of the mobile computing device to remove from view the first one of the different holographic animations in favor of overlaying in the image boundary the different one of the different holographic animations referenced by the hyperlink of the activated one of the points. As well, the processor of the computing device in response to the activation of any one of the points, geo-locates the mobile computing device and permits overlaying in the image boundary of the different one of the different holographic animations referenced by the hyperlink of the activated one of the points only on condition that the mobile computing device is geo-located at the physical location associated with the different one of the different holographic animations.

In another embodiment of the invention, a mobile computing device is configured for augmented reality self-guided touring. The device includes a processor, memory, wireless network communications circuitry, and display. The device also includes a camera. Finally, the device includes an augmented reality self-guided touring module. The module includes computer program instructions executing in the memory by the processor that perform receiving by the wireless network communications circuitry from over a computer communications network into the memory, a set of different holographic animations, each being associated with a different physical location of a three-dimensional structure. The program instructions further perform selecting through the display, a first one of the different holographic animations in the set, determining a physical location in the three-dimensional structure assigned to the first one of the different holographic animations that had been selected, and geo-locating the mobile computing device within an area of the three-dimensional structure.

On the condition that the mobile computing device is geo-located at the physical location assigned to the first one of the different holographic animations, the program instructions yet further perform activating the camera and directing the camera to acquire and present in the display, imagery of a proximate portion of the area of the three-dimensional structure, computing an image boundary within the acquired imagery and overlaying in the image boundary in the display, the first one of the different holographic animations while continuing to present in the display newly acquired imagery of the proximate portion of the area of the three-dimensional structure.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an augmented reality self-guided tour. In accordance with an embodiment of the invention, different augmented reality views are stored are received from over a computer communications network into memory of a mobile computing device. At least one of the views presents a holographic animation of a tourable three-dimensional structure with multiple activatable points of interest disposed thereon. Thereafter, a geographic location of the mobile computing device relative to the tourable three-dimensional structure is determined and the camera of the mobile computing device retrieves an image of a surrounding portion of the environment so as to compute a position in image at which to render the view containing the animation. The animation is then projected in the display of the mobile computing device at the computed position. Responsive to a selection of one of the activatable points of interest, it is determined if the geographic location is within a filter defined for the selected one of the activatable point of interest. If so, another of the views is projected in the display at the computed position. Otherwise, a prompt is generated in the display to relocate to a geographic location in the tourable three-dimensional structure associated with the selected one of the activatable points of interest.

Figure 1:
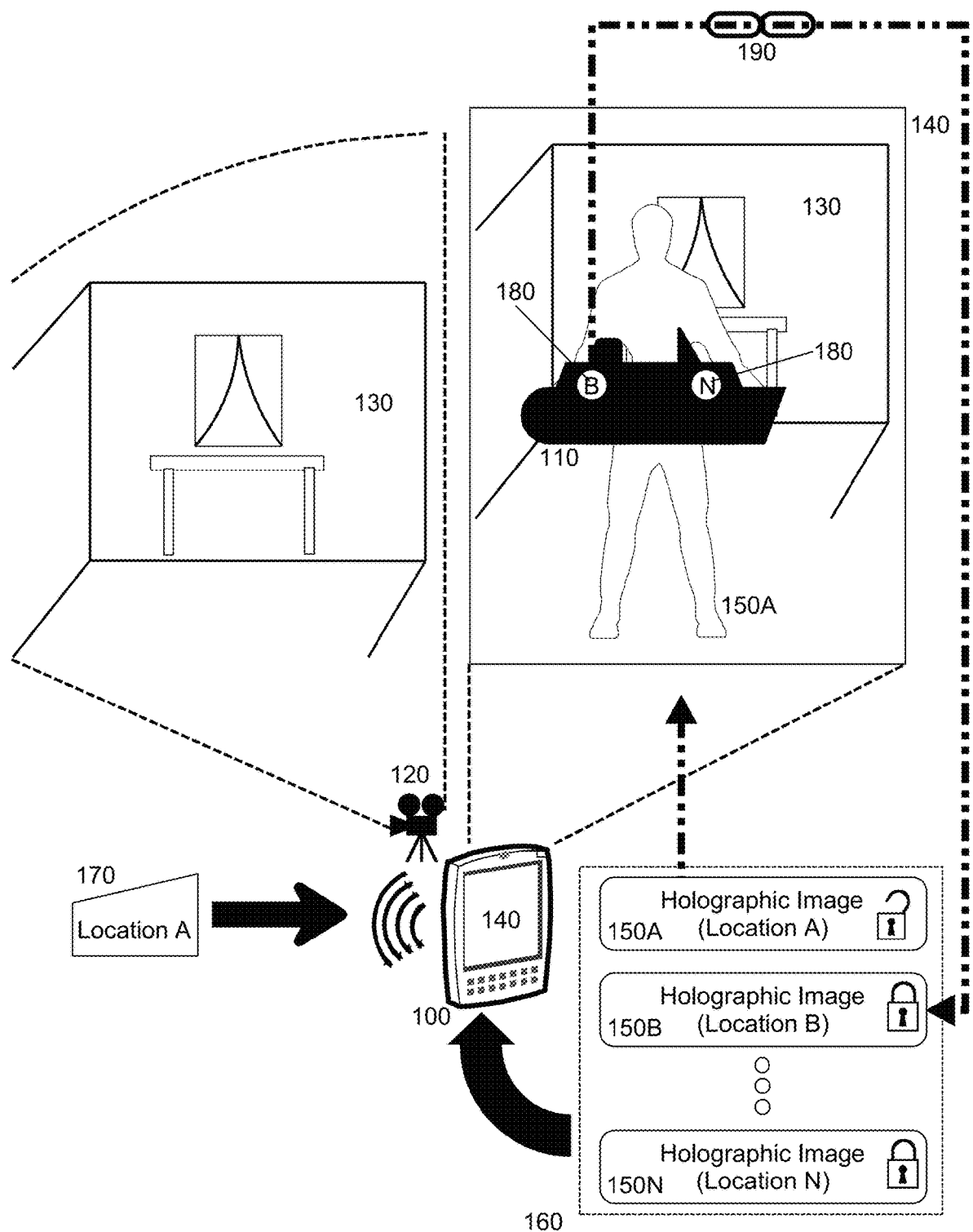
FIG. 1 is a pictorial illustration of an augmented reality self-guided tour.

In further illustration, FIG. 1 pictorially depicts an augmented reality self-guided tour. As shown in FIG. 1, mobile computing device 140 stores therein a pool 160 of multiple different holographic animations 150A, 150B, 150N. Each of the holographic animations 150A, 150B, 150N is associated with a corresponding geographic location of a structure 110, such as a building or a ship as shown. The holographic animations 150A, 150B, 150N may include an individual speaking, an individual speaking while holding a three-dimensional model of the structure 100, one or more individuals dancing within a room of the structure 110, a panoramic animation of a room within the structure 110, or a three-dimensional model of the structure 110. At least one of the holographic animations 150A, 150B, 150N in the pool 160 includes one or more hotspots 180, each of the hotspots 180 corresponding to a particular location in the structure 110 and each of the hotspots 180 including a hyperlink 190 to a different one of the holographic animations 150A, 150B, 150N corresponding to a different location in the structure 110.

In operation, the location 170 of the mobile computing device 100 within the structure 110 is determined and a selected one of the holographic animations 150A, 150B, 150N is determined to correspond with a same location in the structure 110 as the location 170. If so, real-time imagery 130 of a surrounding environment is captured by a camera 120 of the mobile computing device and an area within the real-time imagery 130 is defined. Thereafter, the selected one of the holographic animations 150A, 150B, 150N is projected into the real-time imagery 130 so as to overlay the selected one of the holographic animations 150A, 150B, 150N onto the real-time imagery 130. As updates to the real-time imagery 130 are received in the camera 120, the selected one of the holographic animations 150A, 150B, 150N can remain superimposed over the real-time imagery 130.

As well, responsive to the activation of a hotspot 180 within the superimposed one of the holographic animations 150A, 150B, 150N, a different one of the holographic animations 150A, 150B, 150N is identified according to the hyperlink 190 of the hotspot 180, a geographic location 170 of the mobile computing device 100 is determined, and if the geographic location 170 of the mobile computing device 100 is determined to be the same as the geographic location corresponding to the different one of the holographic animations 150A, 150B, 150N, the different one of the holographic images 150A, 150B, 150N is superimposed onto the real-time imagery 130 so as to have created an augmented reality tourable form of the structure 110.

Figure 2:
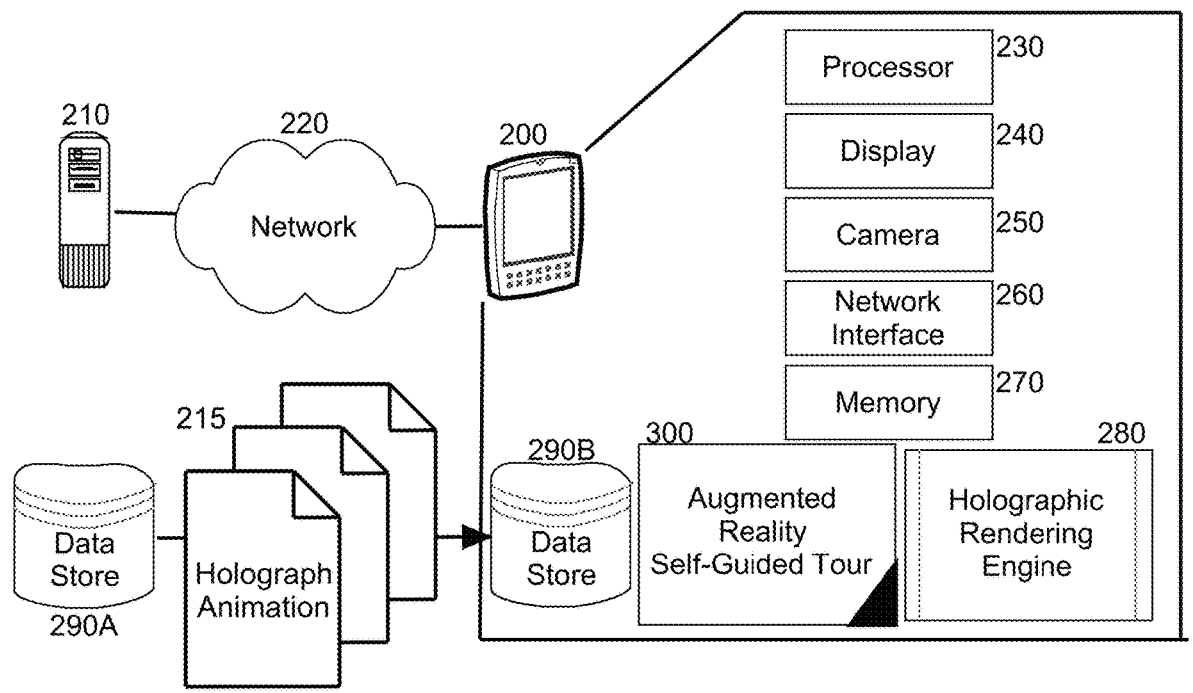
FIG. 2 is a schematic diagram illustrating a self-guided tour data processing system configured for augmented reality; and, FIG. 3 is a flow chart illustrating a process for managing an augmented reality self-guided tour.

The process described in connection with FIG. 1 is implemented in a data processing system. In yet further illustration, FIG. 2 schematically shows a self-guided tour data processing system configured for augmented reality. The system includes a mobile computing device 200 communicatively coupled to a host server 210 from over computer communications network 220. The mobile computing device 220 includes at least one processor 230, a display 240, a camera 250, a network interface 260 and memory 270. The system also includes data store 290A and/or data store 290B in which holographic animations 215 are stored. To that end, a holographic rendering engine 280 executes in the memory 270 by the processor and displays selected ones of the holographic animations 215 in a bounded region of the display 240 displaying real-time camera imagery of the camera 250.

Notably, an augmented reality self-guided tour module 300 is included in the system. The module 300 includes computer program instructions that when executing in the memory 270 by the processor 230, are enabled to select one of the holographic animations 215 from either data store 290A, 290B, and to determine a contemporaneous location of the mobile computing device 200. The contemporaneous location of the mobile computing device 200 may be determined, for instance, by receiving in the memory 270 global positioning system coordinates (GPS), or by extracting location information from data received through the network interface 260 from over the computer communications network 220.

The computer program instructions are further enabled during execution in the memory 270 by the processor 230 to compare the determined contemporaneous location to a location associated with the selected one of the holographic animations 215. On the condition that the geographic locations match, the program instructions are then enabled to direct the camera 250 to capture and render in the display 240, real-time imagery of the surrounding environment of the mobile computing device 200 and to direct the holographic rendering engine 280 to overlay the selected one of the holographic animations 215 in the display 240 over the rendering of the real-time imagery of the surrounding environment. In this way, an augmented reality self-guided tour may be presented in the mobile computing device 200.

Figure 3:
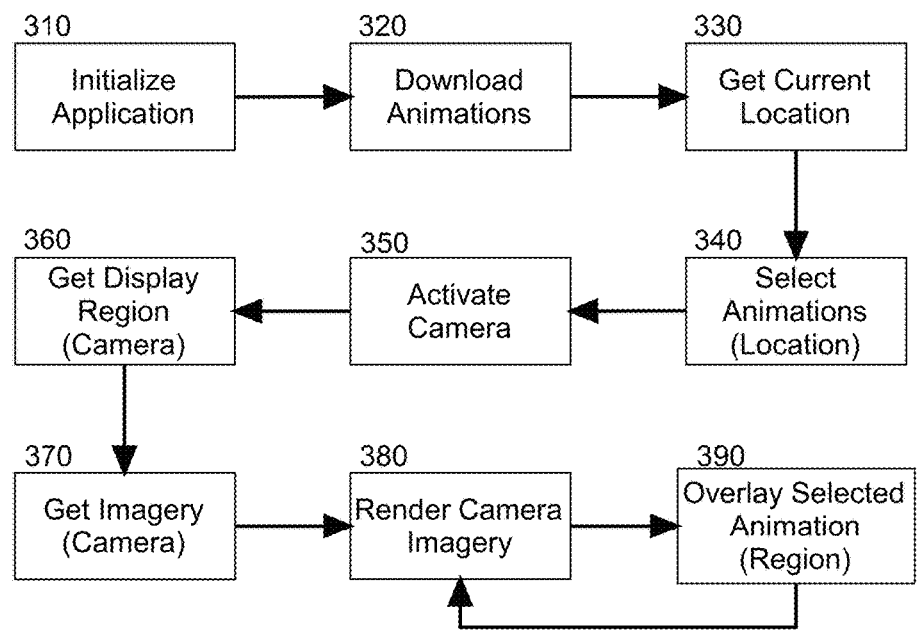

In even yet further illustration of the operation of the augmented reality self-guided tour module 300, FIG. 3 is a flow chart illustrating a process for managing an augmented reality self-guided tour. Beginning in block 310, the module is initialized in memory of the mobile computing device and in block 320, one or more holographic animations are retrieved from a remote data store from over the computer communications network and stored into a local data store of the mobile computing device.

In block 330, a current location of the mobile computing device is determined and in block 340, one of the holographic animations is selected in accordance with the current location. (If the determined location is not consistent with a location of the selected holographic animation, a prompt is generated in a display of the mobile computing device instructing movement to the location associated with the selected holographic animation). In any event, in block 350, the camera of the mobile computing device is activated and in block 360, a display region within real-time imagery captured by the camera is defined. In block 370, the real-time imagery continues to be acquired by the camera and is rendered in block 380. Finally, in block 390 the selected holographic animation is overlain (superimposed) upon the rendered real-time imagery.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An augmented reality self-guided tour method comprising:
    receiving from over a computer communications network into memory of a mobile computing device, a set of different holographic animations, each associated with a different physical location of a three-dimensional structure;
    selecting through a display of the mobile computing device, a first one of the different holographic animations in the set;
    determining a physical location in the three-dimensional structure assigned to the first one of the different holographic animations that had been selected;
    geo-locating the mobile computing device within an area of the three-dimensional structure; and,
    on condition that the mobile computing device is geo-located at the physical location assigned to the first one of the different holographic animations, activating a camera of the mobile computing device and directing the camera to acquire and present in the display of the mobile computing device, imagery of a proximate portion of the area of the three-dimensional structure, computing an image boundary within the acquired imagery and overlaying in the image boundary in the display of the mobile computing device, the first one of the different holographic animations while continuing to present in the display of the mobile computing device newly acquired imagery of the proximate portion of the area of the three-dimensional structure.

2. The method of claim 1, wherein the holographic image is a three-dimensional animated model of the three-dimensional structure.

3. The method of claim 2, wherein the three-dimensional animated model when overlain in the image boundary, presents a multiplicity of different activatable points at a virtual location in the model, each of the different activatable points corresponding to an actual geographic position in the three-dimensional structure, each of the different activatable points having a hyperlink to a different one of the different holographic animations in the set, an activation of any one of the points causing a processor of the mobile computing device to remove from view the first one of the different holographic animations in favor of overlaying in the image boundary the different one of the different holographic animations referenced by the hyperlink of the activated one of the points.

4. The method of claim 3, wherein the processor of the computing device in response to the activation of any one of the points, geo-locates the mobile computing device and permits overlaying in the image boundary of the different one of the different holographic animations referenced by the hyperlink of the activated one of the points only on condition that the mobile computing device is geo-located at the physical location associated with the different one of the different holographic animations.

5. The method of claim 2, wherein the three-dimensional structure is a ship.

6. The method of claim 5, wherein at least one of the different holographic animations is a person speaking behind the ship.

7. A mobile computing device configured for augmented reality self-guided touring comprising:
    a processor, memory, wireless network communications circuitry, and display;
    a camera; and,
    an augmented reality self-guided touring module, the module comprising computer program instructions executing in the memory by the processor and performing:
    receiving by the wireless network communications circuitry from over a computer communications network into the memory, a set of different holographic animations, each associated with a different physical location of a three-dimensional structure;
    selecting through the display, a first one of the different holographic animations in the set;
    determining a physical location in the three-dimensional structure assigned to the first one of the different holographic animations that had been selected;
    geo-locating the mobile computing device within an area of the three-dimensional structure; and,
    on condition that the mobile computing device is geo-located at the physical location assigned to the first one of the different holographic animations, activating the camera and directing the camera to acquire and present in the display, imagery of a proximate portion of the area of the three-dimensional structure, computing an image boundary within the acquired imagery and overlaying in the image boundary in the display, the first one of the different holographic animations while continuing to present in the display newly acquired imagery of the proximate portion of the area of the three-dimensional structure.

8. The mobile computing device of claim 7, wherein the holographic image is a three-dimensional animated model of the three-dimensional structure.

9. The mobile computing device of claim 8, wherein the three-dimensional animated model when overlain in the image boundary, presents a multiplicity of different activatable points at a virtual location in the model, each of the different activatable points corresponding to an actual geographic position in the three-dimensional structure, each of the different activatable points having a hyperlink to a different one of the different holographic animations in the set, an activation of any one of the points causing a processor of the mobile computing device to remove from view the first one of the different holographic animations in favor of overlaying in the image boundary the different one of the different holographic animations referenced by the hyperlink of the activated one of the points.

10. The mobile computing device of claim 9, wherein the processor in response to the activation of any one of the points, geo-locates the mobile computing device and permits overlaying in the image boundary of the different one of the different holographic animations referenced by the hyperlink of the activated one of the points only on condition that the mobile computing device is geo-located at the physical location associated with the different one of the different holographic animations.

11. The mobile computing device of claim 8, wherein the three-dimensional structure is a ship.

12. The mobile computing device of claim 11, wherein at least one of the different holographic animations is a person speaking behind the ship.

13. A computer program product for augmented reality self-guided touring, the computer program product including a non-transitory computer readable storage medium having program instructions embodied therewith, the program instructions executable by a device to cause the device to perform a method including:

receiving from over a computer communications network into memory of a mobile computing device, a set of different holographic animations, each associated with a different physical location of a three-dimensional structure;

selecting through a display of the mobile computing device, a first one of the different holographic animations in the set;

determining a physical location in the three-dimensional structure assigned to the first one of the different holographic animations that had been selected;

geo-locating the mobile computing device within an area of the three-dimensional structure; and, on condition that the mobile computing device is geo-located at the physical location assigned to the first one of the different holographic animations, activating a camera of the mobile computing device and directing the camera to acquire and present in the display of the mobile computing device, imagery of a proximate portion of the area of the three-dimensional structure, computing an image boundary within the acquired imagery and overlaying in the image boundary in the display of the mobile computing device, the first one of the different holographic animations while continuing to present in the display of the mobile computing device newly acquired imagery of the proximate portion of the area of the three-dimensional structure.

14. The computer program product of claim 13, wherein the holographic image is a three-dimensional animated model of the three-dimensional structure.

15. The computer program product of claim 14, wherein the three-dimensional animated model when overlain in the image boundary, presents a multiplicity of different activatable points at a virtual location in the model, each of the different activatable points corresponding to an actual geographic position in the three-dimensional structure, each of the different activatable points having a hyperlink to a different one of the different holographic animations in the set, an activation of any one of the points causing a processor of the mobile computing device to remove from view the first one of the different holographic animations in favor of overlaying in the image boundary the different one of the different holographic animations referenced by the hyperlink of the activated one of the points.

16. The computer program product of claim 15, wherein the processor of the computing device in response to the activation of any one of the points, geo-locates the mobile computing device and permits overlaying in the image boundary of the different one of the different holographic animations referenced by the hyperlink of the activated one of the points only on condition that the mobile computing device is geo-located at the physical location associated with the different one of the different holographic animations.

17. The computer program product of claim 14, wherein the three-dimensional structure is a ship.

18. The computer program product of claim 17, wherein at least one of the different holographic animations is a person speaking behind the ship.

* * * * *